Sept. 5, 1967  R. A. HARTMAN  3,340,038
GOB CHUTE WITH FLUID FLOW MEANS
Filed Sept. 21, 1964  2 Sheets-Sheet 1
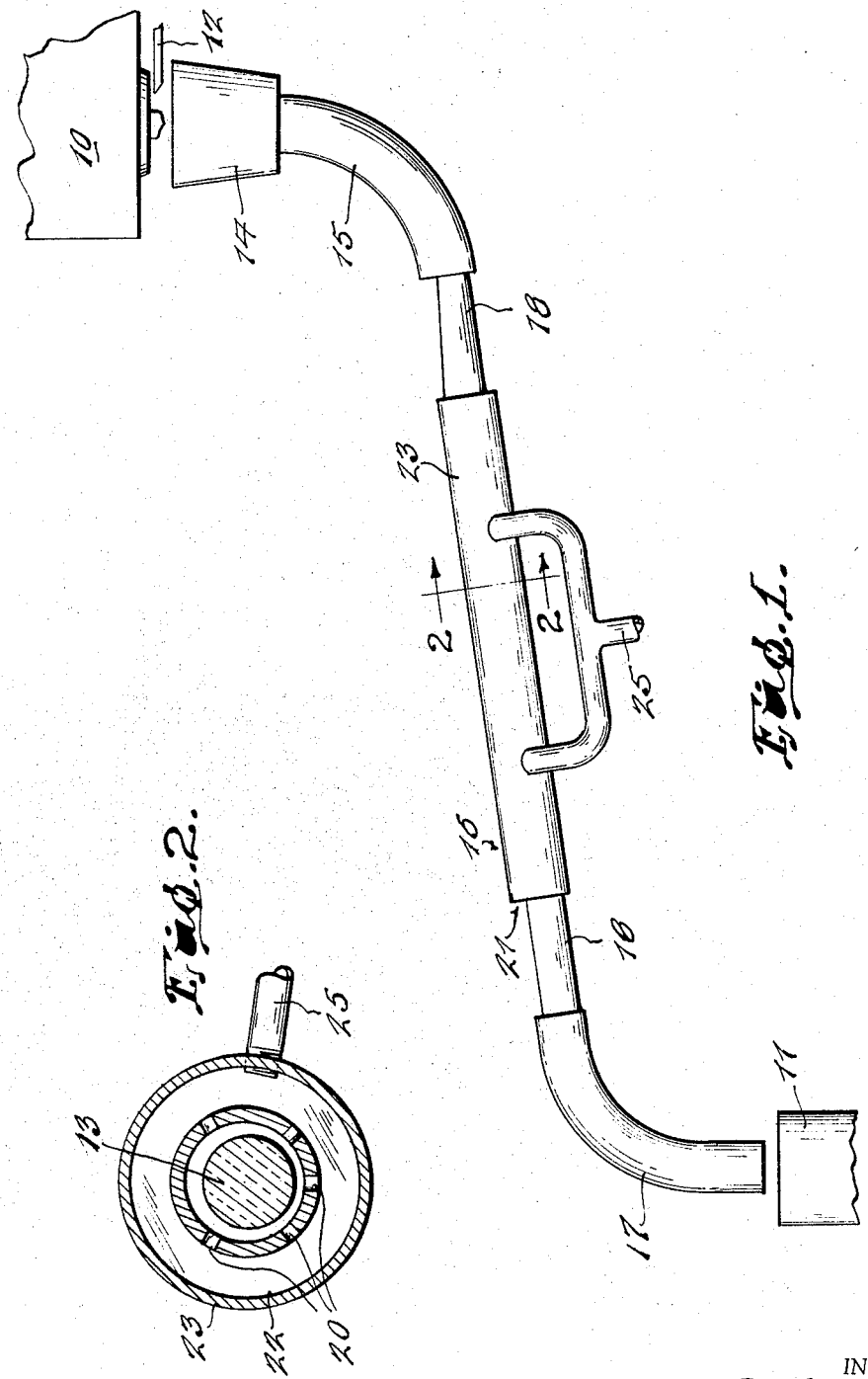
INVENTOR.
ROY ALLEN HARTMAN
BY J. R. Nelson and
W. A. Schaich
ATTORNEY

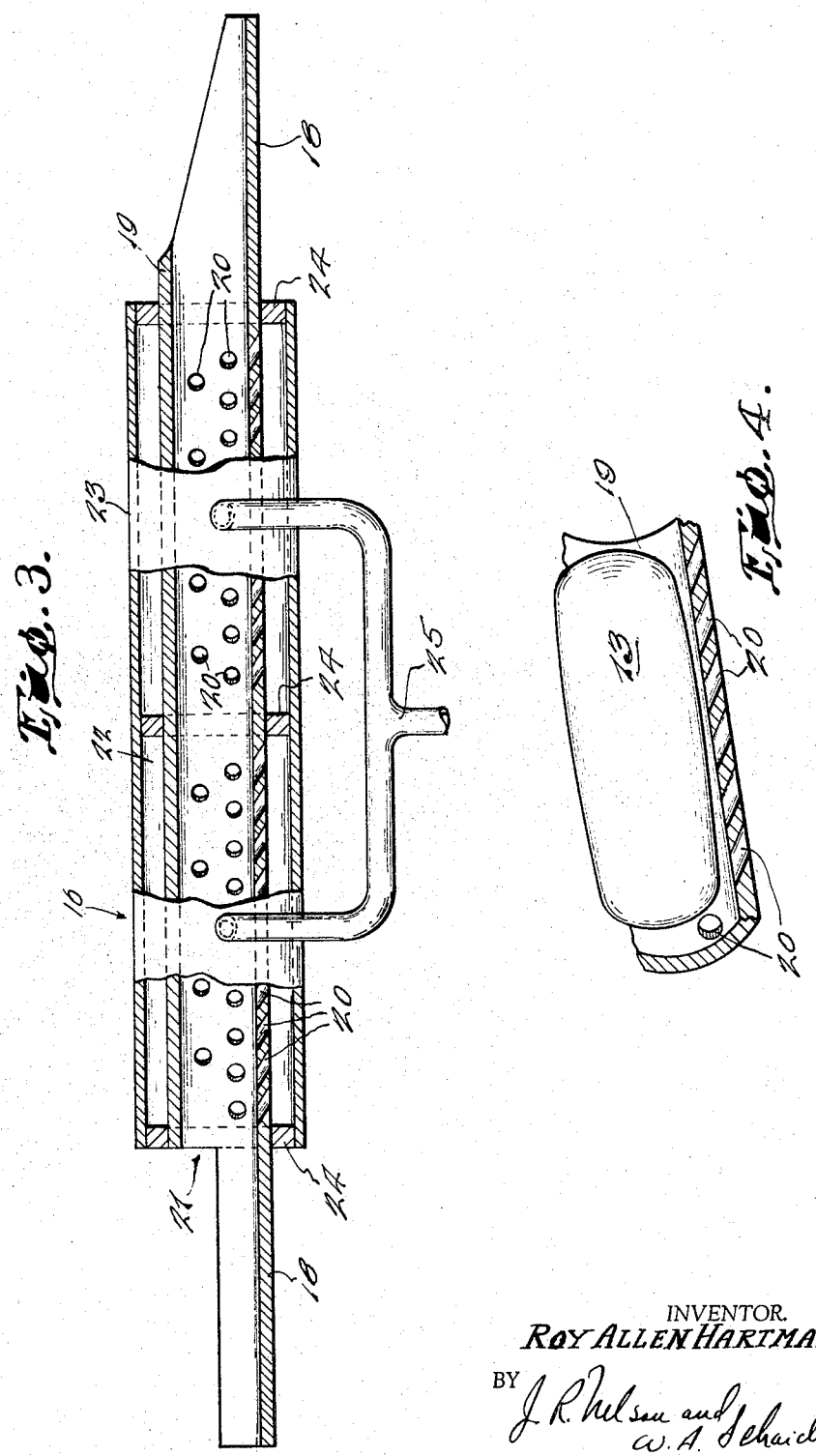

United States Patent Office 3,340,038
Patented Sept. 5, 1967

3,340,038
GOB CHUTE WITH FLUID FLOW MEANS
Roy A. Hartman, San Lorenzo, Calif., assignor to Owens-Illinois Inc., a corporation of Ohio
Filed Sept. 21, 1964, Ser. No. 397,945
3 Claims. (Cl. 65—304)

ABSTRACT OF THE DISCLOSURE

Means for guiding mold charges of molten glass from a feeder outlet to forming molds, comprising an inclined tube and a housing creating an air pressure chamber entirely about a substantial length of the tube, the latter having apertures through which air enters the tube from the chamber in a fashion to both accelerate advance of the mold charges and elevation of same out of contact with the lower side of the tube and with the apertures distributed to any desired speed of advance and extent of lift of the mold charges.

My invention relates to improvements in methods and apparatus for handling molten glass and more particularly is concerned with the transfer of segregated mold charges of molten glass, generally referred to as "gobs," from the point of severance from a parent body, to the molds of a forming machine, which transform such mold charges into bottles, jars, or other articles.

An important object of my invention is the provision of simple, novel and highly effective means for accelerating the movement of mold charges from the feeder to the forming machine and thereby not only increase the potential production speed, but also insure better capacting of glass in the blank or parison mold and particularly in the neck mold, wherein, for example, the neck of a bottle is finally formed incident to initial entry of the glass into the mold.

Another object of my invention is the provision of means whereby accelerated transfer of the mold charges to the forming molds is accompanied by support of such charges upon a cushion of air or some such gas, or a fluid, to the end that metal to glass contact, with known detrimental results, may be definitely avoided, in large measure.

It is also an object of my invention to provide an elongated delivery tube between the feeder and forming machine as the sole means for guidance of the mold charges through a major part of the distance between the feeder and molds and to introduce jets of gas or a fluid into such tube in a fashion to both propel the mold charges longitudinally of the tube and elevate such charges out of contact with the tube wall.

Other objects will be apparent hereinafter.

In the accompanying drawings forming a part of my application:

FIG. 1 is an elevational view of my invention positioned between a conventional mold charge feeder and a mold of a forming machine.

FIG. 2 is a cross-sectional view taken along the plane of line 2—2 of FIG. 1.

FIG. 3 is a vertical longitudinal sectional view of my invention.

FIG. 4 is a detail fragmentary sectional view showing a mold charge and a portion of the floor of the transfer tube.

In the illustrated embodiment of my invention, it is shown positioned between a conventional feeder 10 for molten glass and the mold 11 of a forming machine (not shown). Shears 12 or other severing means function to segregate mold charges 13 from a parent body of glass in the feeder. Although the mold 11 shown is conventional and is charged by depositing a "gob" of glass in the open upper end, the neck mold (not shown) being at the lower end, this relationship may be reversed so that the mold charge would enter the open lower end of the parison mold and move upwardly to fill the neck mold. This concept is revealed in numerous issued U.S. patents. Obviously, the present invention is well adapted for use to advantage in either situation, or both, as will be abundantly evident hereinafter.

Mold charges 13 of molten glass severed from the parent body by the shears 12 fall by gravity into a funnel 14, then move by gravity through a curved conduit 15 and thence through a guide means 16 comprising my invention and finally through a pipe or conduit 17 to the parison mold 11. A short open trough 18 connects each end of the guide means 16 to one of the curved or elbow-like pipes 15 and 17.

The guiding means comprising my invention includes an elongated tube 19 provided at its ends with the aforementioned troughs 18. To the end that air or some other suitable gas or a liquid, may be introduced into the tube 19 in a manner to both accelerate advance of mold charges 13 of molten glass therethrough and elevate them from bodily physical contact with the tube wall, said wall is perforated by the creation of a plurality of properly spaced apart angular apertures 20.

These apertures 20, for example, may be arranged in three relatively closely spaced longitudinal rows (FIG. 2) wherein these rows are concentrated in the lowermost portions of the tube. Two additional longitudinal rows of such apertures are provided in the upper half of the tube. Because all of these apertures are positioned with their axes at more or less an obtuse angle to the axis of the tube and have their inner or discharge ends generally facing the exit end 21 of the tube, it is evident that air or some liquid entering the tube from these apertures, under suitable pressure, will not only accelerate forward movement of mold charges entering the tube but will also, by reason of the additional apertures and air in the lower areas of said tube, elevate the mold charges slightly, causing them to advance, supported upon a cushion of air. Thus, glass to metal contact and the resultant detrimental effects is avoided.

Supply of air, gas, or some suitable liquid, under pressure, to the apertures 20, is provided by means including a concentric elongated chamber 22 encircling the tube 19. A sleeve 23, spaced from the tube by combined sealing and spacing rings or collars 24 cooperates with said tube in creating the chamber 22. The intermediate collar 24 serves to divide the chamber 22 into two sections or compartments, so that, if desired, air or gas at two different pressures may be maintained in the two sections or compartments of the chamber. Thus, a relatively low pressure may enter the upper compartment or inlet section of the tube with a much higher pressure of air in the lower compartment to thereby impart maximum lineal speed to the mold charges as they approach the mold 11.

Supply lines 25 leading from a source (not shown) deliver air, gas, or some suitable accelerant to the chamber 23 under proper pressure.

Modifications may be resorted to within the spirit and scope of the appended claims. For example more than one collar 24 may be employed to thereby create several chambers, each connected to its own air or fluid supply. Thus air or fluid at various pressures may be supplied to the chambers to produce the desired rate of acceleration of the mold charges.

I claim:
1. In glass mold charge guiding means, an inclined elongated tube through which successive mold charges are to move in part by gravity, said tube having a plurality of apertures through its wall each disposed at an angle to the tube axis such that the inner end of each aperture faces generally in the direction of travel of the charges through the tube, and means for directing a gas or liquid through the apertures into the tube thereby to accelerate advance of the mold charges through the tube, there being a tube-like housing concentric with and enclosing the apertured tube and creating an air pressure chamber entirely enclosing said apertured tube, ring-like closing and spacing means at opposite ends of the tube holding the tube and housing spaced apart and sealing the chamber, and air pressure supply means connected to said housing.

2. In glass mold charge guiding means as defined in claim 1, there being at least one annular wall between said ring-like end closing means for dividing the chamber into at least two sections.

3. In glass mold charge guiding means, an elongated inclined tube having inlet and exit ends through which successive mold charges move in part by gravity, said tube having a plurality of apertures extending through its wall with the axis of each aperture disposed at an obtuse angle to the tube axis and each aperture having inlet and discharge ends with the latter nearer the exit end of the tube than the inlet end, and means for supplying gas or liquid under pressure to the inlet ends of the apertures, the last named means being a housing arranged to create a closed chamber completely encircling at least a major part of the length of the tube and means for supplying gas or liquid under pressure to said chamber.

References Cited

UNITED STATES PATENTS 1,638,593   8/1927   Mulholland _____ 65—25

DONALL H. SYLVESTER, *Primary Examiner.*

A. D. KELLOGG, *Assistant Examiner.*